United States Patent
Yu et al.

(10) Patent No.: US 8,699,635 B2
(45) Date of Patent: Apr. 15, 2014

(54) FRAME BOUNDARY DETECTION

(75) Inventors: Chunyang Yu, Cambridge (GB); Andrei Popescu, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 649 days.

(21) Appl. No.: 12/617,537

(22) Filed: Nov. 12, 2009

(65) Prior Publication Data

US 2011/0110470 A1     May 12, 2011

(51) Int. Cl.
    *H03D 1/00*     (2006.01)

(52) U.S. Cl.
    USPC ........... 375/343; 375/340; 375/355; 375/260; 370/208; 370/310; 370/210

(58) Field of Classification Search
    USPC .................... 375/343, 340, 355, 260
    See application file for complete search history.

(56) References Cited

U.S. PATENT DOCUMENTS

| | | | |
|---|---|---|---|
| 7,809,097 B2 * | 10/2010 | Wang et al. | 375/355 |
| 8,027,412 B2 * | 9/2011 | Oh | 375/340 |
| 8,121,229 B2 * | 2/2012 | Kuo et al. | 375/343 |
| 2004/0170237 A1 * | 9/2004 | Chadha et al. | 375/343 |
| 2006/0133525 A1 * | 6/2006 | Awad | 375/260 |
| 2007/0217524 A1 * | 9/2007 | Wang et al. | 375/260 |
| 2007/0280098 A1 * | 12/2007 | Bhatt et al. | 370/208 |

* cited by examiner

*Primary Examiner* — Eva Puente
(74) *Attorney, Agent, or Firm* — RatnerPrestia

(57) ABSTRACT

A method of WLAN frame detection in a received signal, wherein the frame comprises first and second training sequences and the method comprises auto-correlating the signal with a delayed version of itself to establish a first frame boundary estimate based on behavior of the autocorrelation result due to the inclusion of the first training sequence in the frame, cross-correlating the signal with a copy of the second training sequence at a range of time offsets in order to generate a first cross-correlation profile, classifying the first cross-correlation profile into one of a number of categories, establishing a second frame boundary estimate from the first cross-correlation profile in a manner dependent upon the category assigned to the first cross-correlation profile and determining a refined frame boundary estimate on the basis of a consideration of the first and second frame boundary estimates. Apparatus for performing the method is also described.

20 Claims, 4 Drawing Sheets

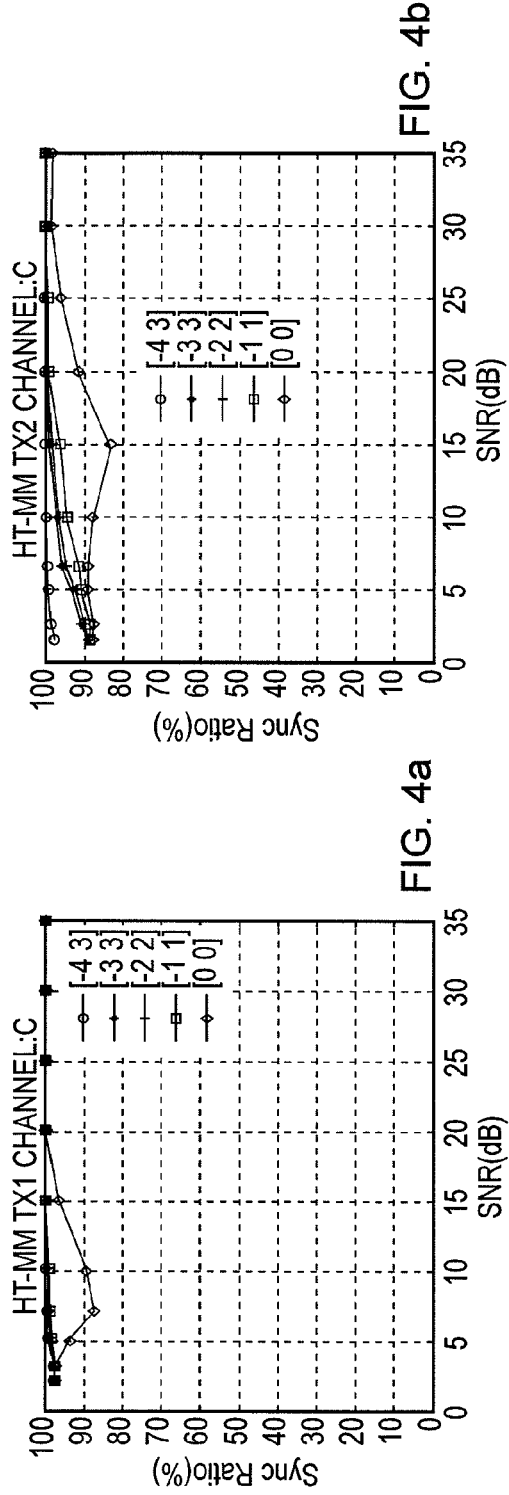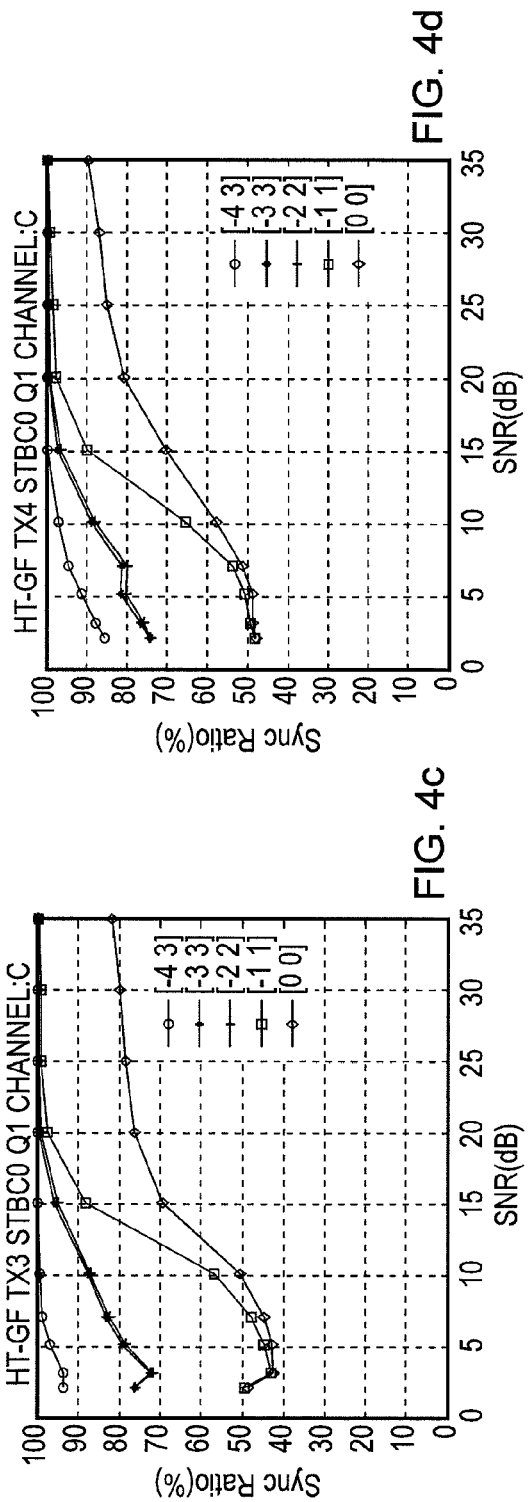

FRAME BOUNDARY DETECTION

FIELD OF THE INVENTION

The invention relates to the field of communications, and in particular to the deduction of frame boundaries within a received signal.

BACKGROUND OF THE INVENTION

According to the IEEE 802.11 standard and in particular its 802.11n-2009 amendment, a physical layer OFDM frame (a 'WLAN frame' or a 'frame') begins with an STF (short training field) followed by an LTF (long training field). In frames with so-called 'legacy' format and frames with mixed mode format, it is L-STF and L-LTF; in frames with green field format, it is HT-GF-STF and HT-GF-LTF1.

An important role of the STF and first LTF is to allow a receiver to estimate the start time (to establish time synchronization) for a received frame. Time synchronization is a sensitive part of 802.11 OFDM receiver design; large synchronisation timing errors introduce inter-symbol interference (ISI) that severely degrades reception. However, because OFDM symbols include a guard interval, small synchronization timing errors may be tolerated without much degradation of the receiver performance.

The STF consists of 10 identical short training symbols, and it is typically used for AGC (automatic gain control), synchronization and coarse frequency offset estimation. Autocorrelation of the STF field with a 0.8 µs time shift generates a slowly varying triangle shaped autocorrelation curve. The triangle's peak provides an estimate of the frame start time $t_{STF}$. However, this autocorrelation peak is sensitive to noise; moderate noise can move the autocorrelation peak by 100-200 ns. Furthermore, autocorrelation with a 0.8 µs time shift can produce false detection in the presence of tone interference or narrow-band interference whose period is a sub-multiple of 0.8 µs.

The STF is followed by an LTF, which includes two identical long training symbols, each 3.2 µs long with a 0.8 µs guard interval. For received signals that are not subject to fading, cross-correlation of the long training symbols with the LTF symbol template generates a sharp peak. The peak provides LTF synchronization timing and reliability information; the peak position is not very sensitive to noise while the peak value generally becomes lower with increasing noise level. LTF synchronization based on cross-correlation can be used to validate detections by an STF autocorrelation synchronizer in order to discard false STF detections, but it is sensitive to the multipath effect, especially when a late arrival path is strong.

The combination of the above two synchronization methods, coarse synchronization timing estimation based on STF autocorrelation followed by verification and fine timing adjustment of LTF cross-correlation, works well when there is only one transmitter space time stream.

In order to increase system throughput, according to IEEE 802.11n-2009, multiple transmitter space time streams are transmitted simultaneously. To prevent unintentional beamforming when similar signals are transmitted in different space time streams, two sets of cyclic time shift values are applied to the non-HT portion and the HT portion of frames respectively. These cyclic time shift values are defined in the IEEE 802.11n-2009 amendment (see table 20-8 and 20-9). The time shift values can be as high as −200 ns and −600 ns for non-HT and HT portion respectively. However, the cyclic time shift introduces a pseudo multipath problem which can cause cross-correlation based time synchronisation algorithms to fail. FIG. 1 is an example of failed LTF synchronization due to the pseudo multipath problem.

The data shown in FIG. 1 is for a receiver operating in HT-GF mode, with a sample period of 50 ns. Due to the −400 ns cyclic time shift introduced in the second transmitter space time stream, there are two peaks occurring in the LTF cross-correlation profile, the late one being the correct synchronization time. Because the first peak is stronger than the second, a receiver that uses the strongest peak to estimate synchronization timing will make a 400 ns synchronization timing error in this case.

With the increase in the number of transmitter space time streams, the number of LTF cross-correlation peaks caused by the cyclic time shift increases, causing their merger or mutual cancellation, so that the LTF cross-correlation profile becomes more complicated. This is called the pseudo multipath effect.

Most synchronization methods for OFDM WLAN are either autocorrelation based algorithms or cross-correlation based algorithms. For autocorrelation based algorithms, when the SNR is not very high, the timing error will be large; autocorrelation also suffers from false detection caused by tone interference or narrow-band interference whose period is a sub-multiple of 0.8 µs. Conventional cross-correlation based algorithms suffer from the pseudo multipath effect in MIMO OFDM WLAN.

Other synchronization methods use a maximum likelihood estimation to achieve better performance; however their complexity is too high for practical implementation. See E. G. Larsson, et al, "Joint Symbol Timing and Channel Estimation for OFDM Based WLANs", IEEE Commun. Letters, vol. 5, no. 8, pp. 325-327, August 2001.

Another class of synchronisation methods relies on the fact that the signal transmitted during the guard interval of each OFDM symbol is repeated at the end of the symbol. See T. M. Schmidl and D. C. Cox, "Robust Frequency and Timing Synchronization for OFDM", IEEE Trans. On Communications, vol. 45, no. 12, pp. 1613-1621, December 1997. However, these methods are more suitable for synchronisation to continuous streams of OFDM symbols, such as in DAB or DVB, rather than for frame transmissions as defined in IEEE 802.11n-2009.

To tackle the pseudo multipath effect in an 802.11n OFDM WLAN system, a three-step timing synchronization method is proposed in Dong Wang, Jinyun Zhang, "Timing Synchronization for MIMO-OFDM WLAN Systems", IEEE Wireless Communications and Networking Conference, 2007. WCNC 2007, pp 1178-1183. In the first step, a sliding window differentiator is concatenated with an auto-correlator to remove the auto-correlation plateau; in the second step, a SIR (signal-to-interference ratio) metric is calculated based on the cross-correlation output in a small search window around the estimated coarse timing position. In the third step, the frame timing is refined in a small window around the estimation from the second step. The implementation complexity is high; also the performance of the algorithm depends heavily on selection of parameter values.

SUMMARY OF THE INVENTION

According to one aspect, the invention provides a method of WLAN frame detection in a received signal, wherein the frame comprises first and second training sequences and the method comprises auto-correlating the signal with a delayed version of itself to establish a first frame boundary estimate based on behaviour of the autocorrelation result due to the inclusion of the first training sequence in the frame, cross-correlating the signal with a copy of the second training sequence at a range of time offsets in order to generate a first cross-correlation profile, classifying the first cross-correlation profile into one of a number of categories, establishing a second frame boundary estimate from the first cross-correlation profile in a manner dependent upon the category assigned to the first cross-correlation profile and determining a refined frame boundary estimate on the basis of a consideration of the first and second frame boundary estimates.

In certain embodiments, the first training sequence is an OFDM WLAN STF. In certain embodiments, the second training sequence is one symbol of an OFDM WLAN LTF.

In certain embodiments, the frame comprises a third training sequence and the method further comprises cross-correlating the signal with a copy of the third training sequence at a range of time delays in order to generate a second cross-correlation profile and boosting the first cross-correlation profile prior to its classification by coherently adding the second cross-correlation profile into the first cross-correlation profile. In certain embodiments, the second and third training sequences are different symbols of an OFDM WLAN LTF.

In certain embodiments, wherein determining a refined frame boundary estimate comprises selecting, as the refined frame boundary estimate, the first frame boundary estimate, the second frame boundary estimate or a weighted combination of the first and second frame boundary estimates. The selection of the refined frame boundary estimate may depend on the peak magnitude in the auto-correlation result. The selection of the refined frame boundary estimate may depend on the difference between the first and second frame boundary estimates.

In certain embodiments, one of the categories is where the first cross-correlation profile has a single peak and for that category the second frame boundary estimate is established as the position of that peak.

In certain embodiments, one of the categories is where the first cross-correlation profile has just two peaks and for that category the second frame boundary estimate is established as the position of the later of those two peaks. The first cross-correlation profile may be smoothed before establishing the second frame boundary estimate.

In certain embodiments, one of the categories is where the first cross-correlation profile has more than two peaks and for that category the second frame boundary estimate is established in dependence upon the positions of the three largest peaks.

In certain embodiments, one of the categories is a residual category for the case where the first cross-correlation profile fits no other category and for the residual category the second frame boundary estimate is established as the position of the maximum in the profile after smoothing.

The invention employs auto-correlation and cross-correlation. These processes may or may not be normalised, depending on the requirements of the specific information concerned.

The invention and various embodiments thereof have been described above in terms of a method. It is to be understood that the invention extends also to apparatus for, or software (whether carried by a suitable carrier—such as a memory device—or otherwise) for, performing a method according to the invention.

BRIEF DESCRIPTION OF THE FIGURES

By way of example only, certain embodiments of the invention will now be described by reference to the accompanying drawings, in which:

FIG. 2, including

FIGS. 4a to 4d are illustrations of how a timing error varies with SNR for different numbers of space time streams in the presence of a fading channel.

DETAILED DESCRIPTION

Figure 1:
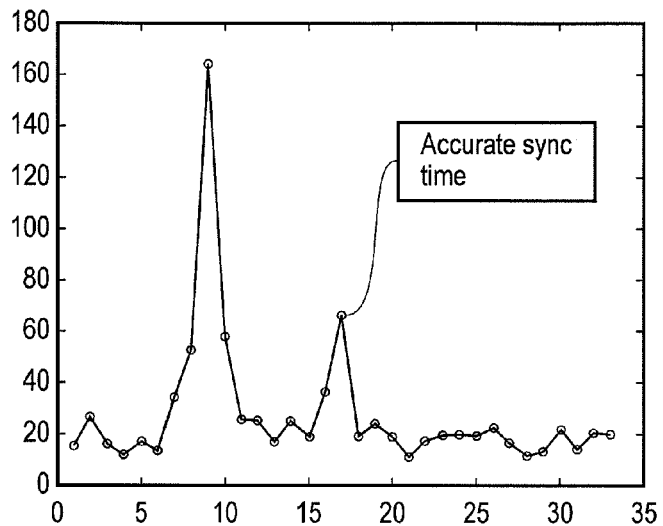
FIG. 1 is a graph showing failed WLAN OFDM LTF synchronisation due to cyclic time shift.
Figure 2A:
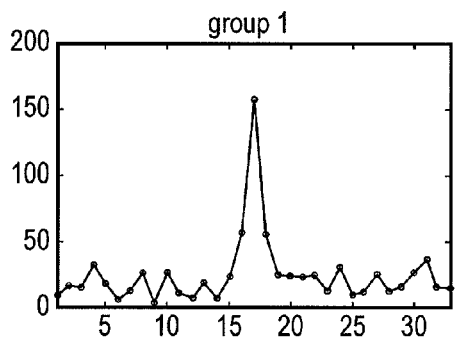
FIGS. 2a to 2d, is an illustration of examples of four correlation profiles falling within four different groups.
Figure 2B:
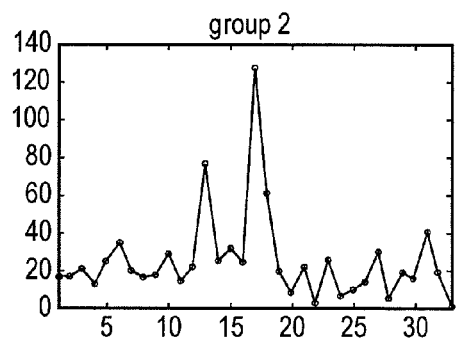
Figure 2C:
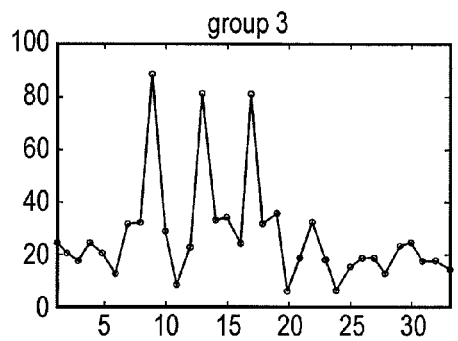
Figure 2D:
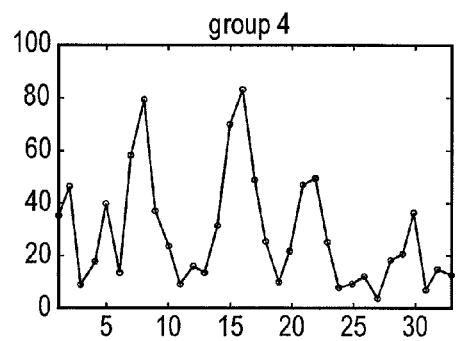
Figure 3A:
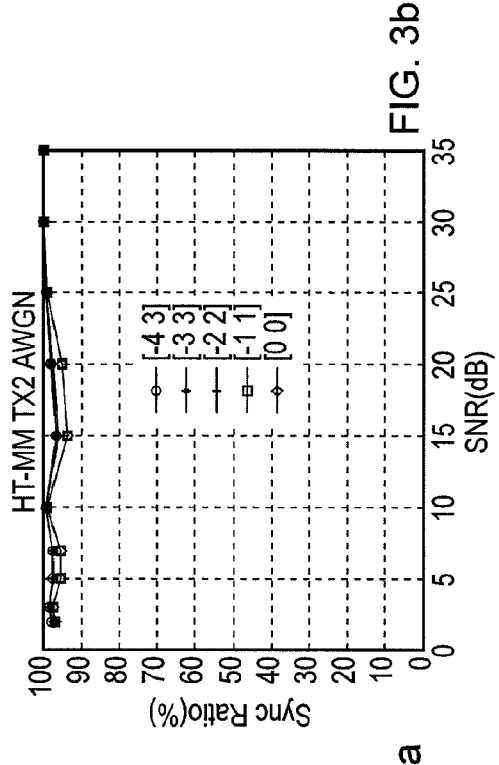
FIGS. 3a to 3d are illustrations of how a timing error varies with SNR for different numbers of space time streams in the presence of an AWGN channel.
Figure 3B:
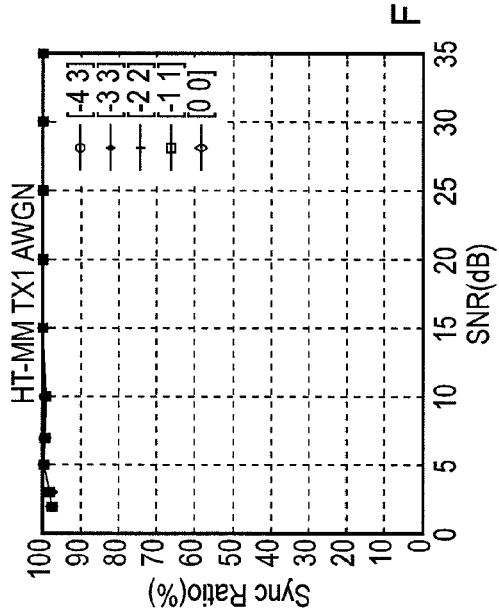
Figure 3C:
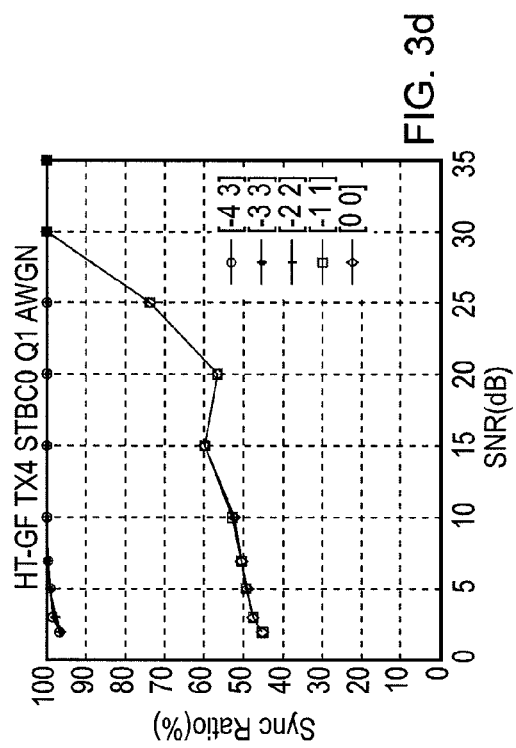
Figure 3D:
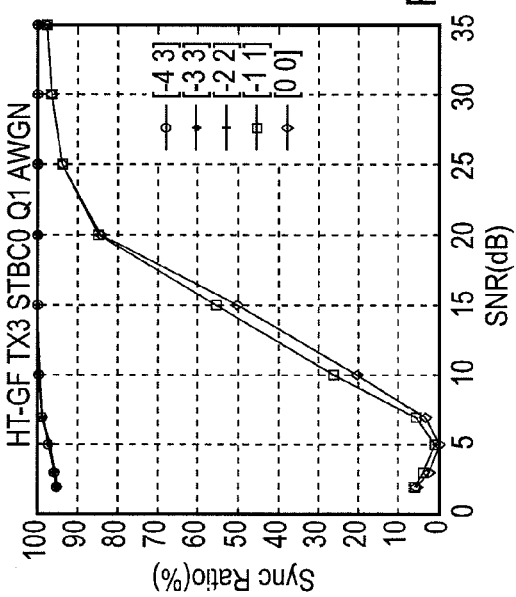
Figure 5:
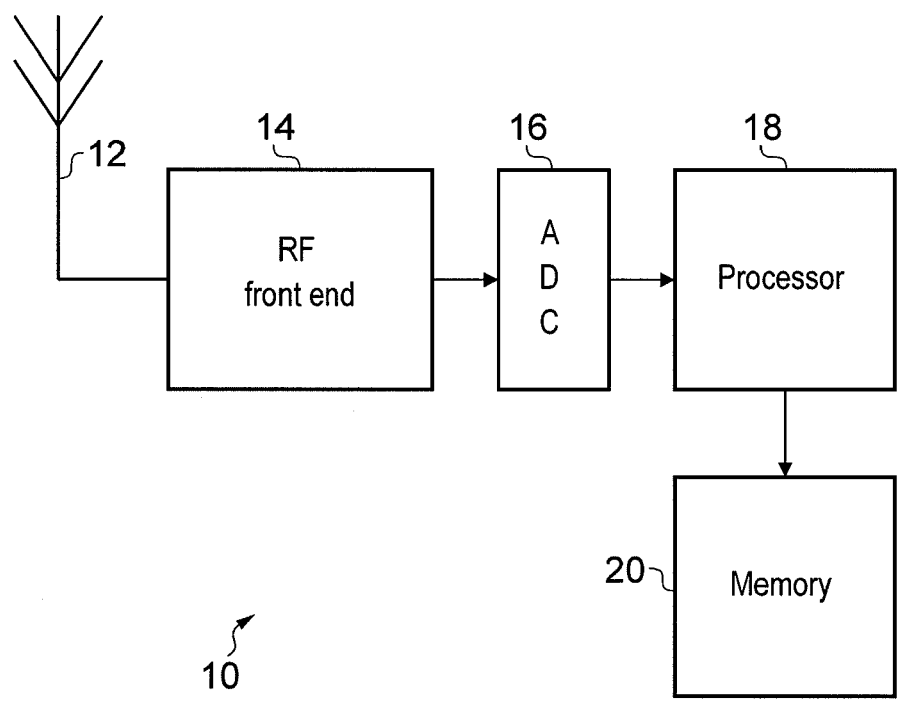
FIG. 5 is a schematic block diagram of an OFDM WLAN receiver.

FIG. 5 illustrates, schematically, an OFDM WLAN receiver 10. The receiver 10 comprises an antenna 12, an RF front-end 14, an analogue-to digital converter (ADC) 16, a data processor 18 and a memory 20. OFDM signals received at the antenna 12 are filtered, amplified and down converted in frequency in the RF front-end 14. The resulting signals are then converted into digital signals by the ADC 16 that are then supplied to the processor 18. The processor 18 in conjunction with the memory 20 decodes the information contained in the OFDM signals. One part of the process of recovering the information content of the OFDM signals is frame synchronisation. An algorithm, hereinafter referred to as a synchronisation algorithm, employed by the processor 18 to detect OFDM WLAN frame boundaries in digital signals arriving from the ADC 16 will now be described.

Synchronisation Algorithm—Brief Outline

In brief, the synchronisation algorithm comprises the following five steps.

Step 1: Make a frame detection (STF detection), a first timing estimate $t_{STF}$ and a coarse frequency estimate $f_{STF}$ based on autocorrelation with an 800 ns time delay. The subsequent processing steps (2 to 5 described below) are only performed following an STF detection.

Step 2: Perform the coherent sum of two LTF symbol cross-correlation profiles, within a time window centred on the expected timing of the first LTF, estimated based on $t_{STF}$. The first LTF consists of two LTF symbols; the cross-correlation profiles for these two symbols are coherently added to improve the reliability of detection. The result of this sum is the LTF cross-correlation profile used in subsequent processing.

Step 3: LTF cross-correlation profile classification. The LTF cross-correlation profile is classified into one of four groups. For each group, the LTF synchronization timing is estimated differently to reduce the timing error.

Step 4: Perform LTF synchronisation detection and estimate LTF timing. An FIR filter is proposed to improve timing accuracy for some groups of LTF cross-correlation profile classification. At this stage, STF synchronisation detections that are not validated by LTF synchronisation detections are discarded as false alarms.

Step 5: Synchronisation timings from STF and LTF synchronizers are combined to give the final synchronization timing $t_{sync}$. When the received signal is strong (the SNR is high), the STF synchronizer timing is used, $t_{sync}=t_{STF}$; when the SNR is low, the LTF synchronizer timing is used, $t_{sync}=t_{STF}$; when the SNR is neither high nor low, based on the observation that the STF timing error tends to be late while the LTF timing error tends to be early, $$t_{sync} = \frac{t_{STF} + t_{LTF}}{2}.$$

Synchronisation Algorithm—a More Detailed Discussion

Given a discrete-time received base-band signal s(n), for n=1, 2, ..., N, where the sample rate is 1/Δt, the proposed synchronization algorithm is described in more detail below:

Step 1: Continuously calculate the autocorrelation profile with an 800 ns time delay:

$$R(n) = \left| \sum_{m=0}^{L-1} s(n-m)s^*(n-m+T_0) \right| \quad (1)$$

When the sample period Δt is 50 ns, L and $T_0$ are 144 (9 STF symbols) and 16 samples respectively. Then search for local peaks of R(n). We denote one such peak position $n_0$ and its peak value $V_{STF}$. $V_{STF}$ is compared with a threshold value $T_{STF}$. When $V_{STF} > T_{STF}$, STF synchronization is detected and the STF synchronization timing estimate is $t_{STF}=(n_0-L)\Delta t$. If $V_{STF} < T_{STF}$, no STF synchronization is found and if s(n) contains a WLAN frame starting at $(n_0-L)\Delta t$, then a missed detection occurs. On the other hand, when s(n) does not contain a WLAN frame, but a peak is detected with $V_{STF}$ exceeding $T_{STF}$, then a false STF detection occurs. $T_{STF}$ is selected empirically to minimise false detections ('false alarms') and missed detections.

Step 2: When STF synchronisation is detected ($V_{STF}$ exceeds $T_{STF}$), then frequency offset compensation is applied to the received signal prior to further processing as shown in equation (2). Δf is the estimated frequency offset; it may be the coarse frequency offset estimate $f_{STF}$ or on an adjusted frequency offset estimate based on processing the LTF field.

$$\hat{s}(n)=s(n)\exp(-j2\pi n\Delta t \cdot \Delta f) \quad (2)$$

Then calculate the LTF cross-correlation profile:

$$C(m) = \left| \sum_{k=1}^{K} [\hat{s}(n_0 + T_1 + m + k) + \hat{s}(n_0 + T_1 + m + T_2 + k)]T^*(k) \right| \quad (3)$$

In the above expression, * is the complex conjugate. The template {T(k)|k=1, 2, ..., K} is the ideal LTF symbol defined in the IEEE 802.11n-2009 amendment or a quantized version of it. When the sample period is 50 ns, the values of $T_1$, $T_2$ and K are 48, 64 and 64 samples respectively. The range for m is [−W W], where W is the LTF synchronisation timing search radius, for example 0.8 μs before and after $t_{STF}$. The expression in equation (3) is in fact a coherent sum of the correlation of T with the first LTF symbol (assumed to commence at symbol $n_0+T_1+m+1$ in ŝ) and the correlation of T with the second LFT symbol (assumed to commence at symbol $n_0+T_1+m+T_2+1$ of signal ŝ.

Step 3: Classify the LTF cross-correlation profile into one of the following four groups:
(1) Single peak;
(2) Two peaks which are less than 700 ns away;
(3) More than two peaks;
(4) The others.

Typical LTF cross-correlation profiles for the above four groups are illustrated in FIG. 2. Classification is based on parameters estimated from the LTF cross-correlation profile. Assuming the values of the three largest LTF cross-correlation profile local peaks are, in decreasing order of the peak magnitude, $P_1$, $P_2$, $P_3$, and their time positions are $d_1\Delta t$, $d_2\Delta t$, $d_3\Delta t$ respectively ($-W \leq d_k\Delta t \leq W$, k=1, 2, 3) and with a mean value $m_0$ of the cross-correlation profile, then the parameters used for classification are:

$$P_{21} = \frac{P_2}{P_1}, P_{31} = \frac{P_3}{P_1} \quad (a)$$

$$\frac{P_1}{m_0}, \frac{P_2}{m_0}, \frac{P_2}{m_0}; \quad (b)$$

$$d_{21} = |d_1 - d_2|\Delta t; \quad (c)$$

The classification criteria are described below:

(1) If $$\frac{P_2}{m_0} < T_1, P_{21} \leq r_1 \text{ and } \frac{P_1}{m_0} \geq T_2,$$

the profile belongs to the single peak group. For example, in our simulations, $T_1$=2.5, $r_1$=0.35, $T_2$=4;

(2) Otherwise, if $$\frac{P_3}{m_0} < T_3$$

and $P_{31} \leq r_3$ and either $$\frac{P_2}{m_0} \geq T_1$$

or $P_{21} \geq r_2$ and $d_{21} \leq 700$ ns, the profile belongs to the two peak group. In the simulation, $T_3$=2.25, $r_3$=0.5, $r_2$=0.4;

(3) Otherwise if $P_{31} \geq r_3$, it belongs to group (3);

(4) Otherwise, the profile belongs to group (4).

Step 4: After classification, the LTF synchronization timing $t_{LTF}$ is determined as below:

(1) If a synchronization is found by the STF synchronisation in step 1 but $P_1 < P_{th}$, then it is considered that false detection has occurred, which may be caused by tone interference or narrow-band interference whose period is a sub-multiple of 0.8 μs. The threshold value $P_{th}$ is chosen to balance the probabilities of missed detection and false detection.

(2) Otherwise if the cross-correlation profile belongs to group (1), the synchronisation timing corresponds to the largest cross-correlation profile peak position, $t_{LTF}=t_{STF}+d_1\Delta t$;

(3) Otherwise if the cross-correlation profile belongs to group (2), the cross-correlation profile is smoothed by an FIR filter whose impulse response is [1 0.5 0.5 0.5 0.5]. This filter enhances late peaks in the L-LTF when there are multiple space time streams. Then denoting $d_2'$ the position of the second local peak in terms of time sequence of the smoothed profile, $t_{LTF}=t_{STF}+d_2\Delta t$.

(4) Otherwise if the cross-correlation profile belongs to group (3), assuming that, among the three largest local peaks, the earliest peak position is $d_{pe}$ and the latest peak position $d_{pl}$, the LTF synchronization timing $t_{LTF}$ is:

$$\begin{cases} t_{STF} + (d_{pl}+2)\Delta)\Delta t & \text{if } (d_{pl}-d_{pe})\Delta\Delta \le 450 \text{ ns} \\ t_{STF} + d_{pl}\Delta t & \text{if } 450 \text{ ns} < (d_{pl}-d_{pe})\Delta\Delta \le 600 \text{ ns} \\ t_{STF} + \left[\dfrac{d_{pe}+d_{pl}}{2}\right]\Delta t & \text{otherwise} \end{cases} \quad (4)$$

(5) Otherwise if the cross-correlation profile belongs to group (4), pass the LTF cross-correlation profile through the FIR filter mentioned in (3), find the largest local peak position $\hat{d}_1\Delta t$ in the smoothed profile and use $t_{LTF}=t_{STF}+\hat{d}_1\Delta t$.

Step 5: The STF and LTF timings are used to determine the final synchronization timing:

(1) If the STF autocorrelation profile peak $V_{STF}$ is high, the LTF cross correlation profile peak is also very high and the difference between $t_{STF}$ and $t_{LTF}$ is no more than 200 ns, then the LTF synchronization timing $t_{LTF}$ is adopted as the final synchronisation timing;

(2) Otherwise if the STF autocorrelation profile peak is high, and either the LTF cross-correlation profile peak is not very high, or the difference between $t_{LTF}$ and $t_{STF}$ is more than 200 ns, then STF synchronization timing $t_{STF}$ is adopted as the final synchronisation timing;

(3) Otherwise if the STF autocorrelation profile peak is neither high nor low, and the difference between $t_{LTF}$ and $t_{STF}$ is no more than 200 ns, the LTF synchronizer timing $t_{LTF}$ is used as the final synchronisation timing;

(4) Otherwise if the STF autocorrelation profile peak is neither high nor low, but the difference between $t_{LTF}$ and $t_{STF}$ is more than 200 ns, then $$\dfrac{t_{STF}+t_{LTF}}{2}$$

is used as the final synchronisation timing;

(5) Otherwise if the STF autocorrelation profile peak is very low and the difference between $t_{LTF}$ and $t_{STF}$ is more than 200 ns, then the LTF synchronizer timing $t_{LTF}$ is used as the final synchronisation timing.

Step 5 depends on, amongst other things, tests using relative criteria, e.g. examining whether peaks in correlation process results are high or low. The meanings of the terms "high" and "low" in the context of step 5 are determined empirically (and in any event depend on whether the auto- and cross-correlations are normalised (in the preceding embodiment they are not)). For example, it is possible to estimate the probability distribution of the peaks in the auto- and cross-correlation profiles (e.g. through Monte-Carlo simulation over a range of relevant SNRs and fading conditions) and define thresholds for determining whether a peak is "high" or "low".

The variations in the synchronization ratio (sync ratio) with SNR for various numbers of transmitter space time streams under an AWGN channel and a fading channel (the IEEE fading model C) are shown in FIGS. 3a to 3d and FIGS. 4a to 4d respectively. In these figures, HT-MM means mixed mode high throughput mode, HT-GF means Greenfield high throughput mode; TxX means X transmit antennas; STBC0 or STBC1 means disable/enable spatial time block coding; Q1 means using identity matrix of direct mapping in spatial mapping (this definition refers to paragraph 20.3.11.10.1 'Spatial mapping' of the IEEE 802.11n-2009 amendment). STS is an abbreviation for 'space time stream'. In these simulations, the sample period is 50 ns. The legends in FIGS. 3 and 4 represent tolerance windows for the final synchronisation timing error. So $[-n_1\ n_2]$ means the synchronization timing error is $-n_1\Delta t \le \Delta t_{sync} \le n_2\Delta t$. The 'sync ratio' in these figures is the percentage of simulation runs whose synchronization timing errors fall within the prescribed range.

As shown in the above FIGS. 3a to 3d, when the SNR is high, under an AWGN channel, the timing error will be zero or very close to zero. Over the entire SNR range (down to an SNR of 2 dB), under an AWGN channel, the timing error is within $[-2\ 2]$ samples ($[100\ \text{ns}\ 100\ \text{ns}]$).

The proposed synchronization algorithm also works well under moderate fading conditions (IEEE fading model C) as shown in FIGS. 4a to 4d.

Thus, a frame synchronization algorithm for MIMO OFDM WLAN has been described, which algorithm can effectively mitigate the pseudo multipath effect caused by cyclic time shift under both an AWGN channel and a fading channel.

The described frame synchronisation algorithm has low complexity for real time implementation; it effectively overcomes the pseudo multipath effect due to the cyclic time shift in 802.11n MIMO OFDM WLAN. Through simulation, the synchronization algorithm has shown small timing error, so that receipt of frames using short guard interval mode can work properly.

The invention claimed is:

1. A method of WLAN frame detection in a received signal, wherein the frame comprises first and second training sequences and the method comprises auto-correlating the signal with a delayed version of itself to establish a first frame boundary estimate based on behaviour of the autocorrelation result due to the inclusion of the first training sequence in the frame, cross-correlating the signal with a copy of the second training sequence at a range of time offsets in order to generate a first cross-correlation profile, classifying the first cross-correlation profile into one of at least three categories, establishing a second frame boundary estimate from the first cross-correlation profile in a manner dependent upon a category of the at least three categories into which the first cross-correlation profile is classified and determining a refined frame boundary estimate on the basis of the first and second frame boundary estimates.

2. A method according to claim 1, wherein the frame comprises a third training sequence and the method further comprises cross-correlating the signal with a copy of the third training sequence at a range of time delays in order to generate a second cross-correlation profile and boosting the first cross-correlation profile prior to its classification by coherently adding the second cross-correlation profile into the first cross-correlation profile.

3. A method according to claim 1, wherein determining the refined frame boundary estimate comprises selecting, as the refined frame boundary estimate, the first frame boundary estimate, the second frame boundary estimate or a weighted combination of the first and second frame boundary estimates.

4. A method according to claim 3, wherein the selection of the refined frame boundary estimate depends on a peak magnitude in the auto-correlation result.

5. A method according to claim 3, wherein the selection of the refined frame boundary estimate depends on a difference between the first and second frame boundary estimates.

6. A method according to claim 3, wherein the selection of the refined frame boundary estimate depends on a peak magnitude in the first cross-correlation profile.

7. A method according to claim 1, wherein one of the at least three categories is where the first cross-correlation profile has a single peak and for that category the second frame boundary estimate is established as the position of that peak.

8. A method according to claim 1, wherein one of the at least three categories is where the first cross-correlation profile has just two peaks and for that category the second frame boundary estimate is established as the position of the later of those two peaks.

9. A method according to claim 8, wherein the first cross-correlation profile is smoothed before establishing the second frame boundary estimate.

10. A method according to claim 1, wherein one of the at least three categories is where the first cross-correlation profile has more than two peaks and for that category the second frame boundary estimate is established in dependence upon the positions of the three largest peaks.

11. A method according to claim 1, wherein one of the at least three categories is a residual category for the case where the first cross-correlation profile fits no other category and for the residual category the second frame boundary estimate is established as the position of the maximum in the profile after smoothing.

12. A method of WLAN frame detection in a received signal, wherein the frame comprises first and second training sequences and the method comprises auto-correlating the signal with a delayed version of itself to establish a first frame boundary estimate based on behaviour of the autocorrelation result due to the inclusion of the first training sequence in the frame, cross-correlating the signal with a copy of the second training sequence at a range of time offsets in order to generate a first cross-correlation profile, classifying the first cross-correlation profile into one of a number of categories based on a number of peaks in the first cross-correlation profile, establishing a second frame boundary estimate from the first cross-correlation profile in a manner dependent upon the category into which the first cross-correlation profile is classified and determining a refined frame boundary estimate on the basis of the first and second frame boundary estimates.

13. A method according to claim 12, wherein the frame comprises a third training sequence and the method further comprises cross-correlating the signal with a copy of the third training sequence at a range of time delays in order to generate a second cross-correlation profile and boosting the first cross-correlation profile prior to its classification by coherently adding the second cross-correlation profile into the first cross-correlation profile.

14. A method according to claim 12, wherein determining the refined frame boundary estimate comprises selecting, as the refined frame boundary estimate, the first frame boundary estimate, the second frame boundary estimate or a weighted combination of the first and second frame boundary estimates.

15. A method according to claim 14, wherein the selection of the refined frame boundary estimate depends on a peak magnitude in at least one of the auto-correlation result and the first cross-correlation profile.

16. A method according to claim 14, wherein the selection of the refined frame boundary estimate depends on a difference between the first and second frame boundary estimates.

17. A method according to claim 12, wherein one of the categories is where the first cross-correlation profile has a single peak and for that category the second frame boundary estimate is established as the position of that peak.

18. A method according to claim 12, wherein one of the categories is where the first cross-correlation profile has just two peaks and for that category the second frame boundary estimate is established as the position of the later of those two peaks.

19. A method according to claim 12, wherein one of the categories is where the first cross-correlation profile has more than two peaks and for that category the second frame boundary estimate is established in dependence upon the positions of the three largest peaks.

20. A method according to claim 12, wherein one of the categories is a residual category for the case where the first cross-correlation profile fits no other category and for the residual category the second frame boundary estimate is established as the position of the maximum in the profile after smoothing.

* * * * *

UNITED STATES PATENT AND TRADEMARK OFFICE
CERTIFICATE OF CORRECTION

| | | |
|---|---|---|
| PATENT NO. | : 8,699,635 B2 | Page 1 of 1 |
| APPLICATION NO. | : 12/617537 | |
| DATED | : April 15, 2014 | |
| INVENTOR(S) | : Yu et al. | |

It is certified that error appears in the above-identified patent and that said Letters Patent is hereby corrected as shown below:

In the Specification

In Column 5, Line 56, delete "LFT symbol" and insert -- LTF symbol --, therefor.

Signed and Sealed this
Ninth Day of September, 2014

Michelle K. Lee
*Deputy Director of the United States Patent and Trademark Office*